US010743242B2

(12) United States Patent
Rolfe et al.

(10) Patent No.: US 10,743,242 B2
(45) Date of Patent: Aug. 11, 2020

(54) SET OF OPTIMIZATIONS APPLICABLE TO A WIRELESS NETWORKS OPERATING IN TV WHITE SPACE BANDS

(71) Applicant: SILVER SPRINGS NETWORKS, INC., Redwood City, CA (US)

(72) Inventors: Benjamin A. Rolfe, Boulder Creek, CA (US); Kunal Pankaj Shah, Mountain View, CA (US); Jay Ramasastry, Reno, CA (US); Cristina Seibert, Mountain View, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 167 days.

(21) Appl. No.: 14/061,679

(22) Filed: Oct. 23, 2013

(65) Prior Publication Data
US 2014/0269546 A1    Sep. 18, 2014

Related U.S. Application Data

(60) Provisional application No. 61/782,863, filed on Mar. 14, 2013.

(51) Int. Cl.
*H04W 48/16* (2009.01)
*H04W 8/00* (2009.01)
*H04W 72/08* (2009.01)
*H04W 72/04* (2009.01)
*H04W 16/14* (2009.01)

(52) U.S. Cl.
CPC ............ *H04W 48/16* (2013.01); *H04W 8/00* (2013.01); *H04W 72/048* (2013.01); *H04W 72/08* (2013.01); *H04W 16/14* (2013.01)

(58) Field of Classification Search
CPC ...... H04W 8/00; H04W 72/08; H04W 72/048
See application file for complete search history.

(56) References Cited

U.S. PATENT DOCUMENTS

| 6,304,756 | B1 * | 10/2001 | Hebeler ............... H04W 36/06 455/434 |
| 2005/0136943 | A1 * | 6/2005 | Banerjee ............. H04B 1/7115 455/456.1 |
| 2007/0099641 | A1 * | 5/2007 | Lastinger et al. ............ 455/512 |
| 2008/0242340 | A1 * | 10/2008 | Kang ................... H04W 72/02 455/525 |
| 2008/0311938 | A1 | 12/2008 | Song |
| 2009/0097530 | A1 * | 4/2009 | Dhodapkar et al. .......... 375/131 |
| 2011/0051695 | A1 * | 3/2011 | Dinan ............... H04W 72/1231 370/336 |

(Continued)

OTHER PUBLICATIONS

International Search Report for Application No. PCT/US2014/024013, dated Jul. 17, 2014.

*Primary Examiner* — Kodzovi Acolatse
*Assistant Examiner* — Jay L Vogel
(74) *Attorney, Agent, or Firm* — Artegis Law Group, LLP

(57) ABSTRACT

An access point coupled to a node within a network is configured to combine channel maps provided by other access points to which the node is coupled, thereby reconciling any discrepancies between those channel maps. The access point may also combine channel maps associated with different regions that the node may occupy, thereby reducing the number of channel maps that must be transmitted to the node when the node travel between regions.

27 Claims, 14 Drawing Sheets

(56) References Cited

U.S. PATENT DOCUMENTS

| | | | |
|---|---|---|---|
| 2011/0090878 A1 | 4/2011 | Seibert et al. | |
| 2011/0143761 A1* | 6/2011 | Uusitalo | H04W 72/02 |
| | | | 455/450 |
| 2011/0299488 A1* | 12/2011 | Kim | H04W 16/16 |
| | | | 370/329 |
| 2011/0312330 A1* | 12/2011 | Sadek | H04W 16/14 |
| | | | 455/452.2 |
| 2012/0009888 A1* | 1/2012 | Smadi | H04W 72/1215 |
| | | | 455/88 |
| 2012/0039284 A1* | 2/2012 | Barbieri | H04W 48/10 |
| | | | 370/329 |
| 2012/0163177 A1 | 6/2012 | Vaswani et al. | |
| 2012/0165059 A1* | 6/2012 | Schmidt | H04L 1/0016 |
| | | | 455/513 |
| 2012/0173758 A1 | 7/2012 | Flammer et al. | |
| 2013/0053054 A1* | 2/2013 | Lovitt et al. | 455/456.1 |
| 2014/0003282 A1* | 1/2014 | Kafle | H04W 4/02 |
| | | | 370/254 |

\* cited by examiner

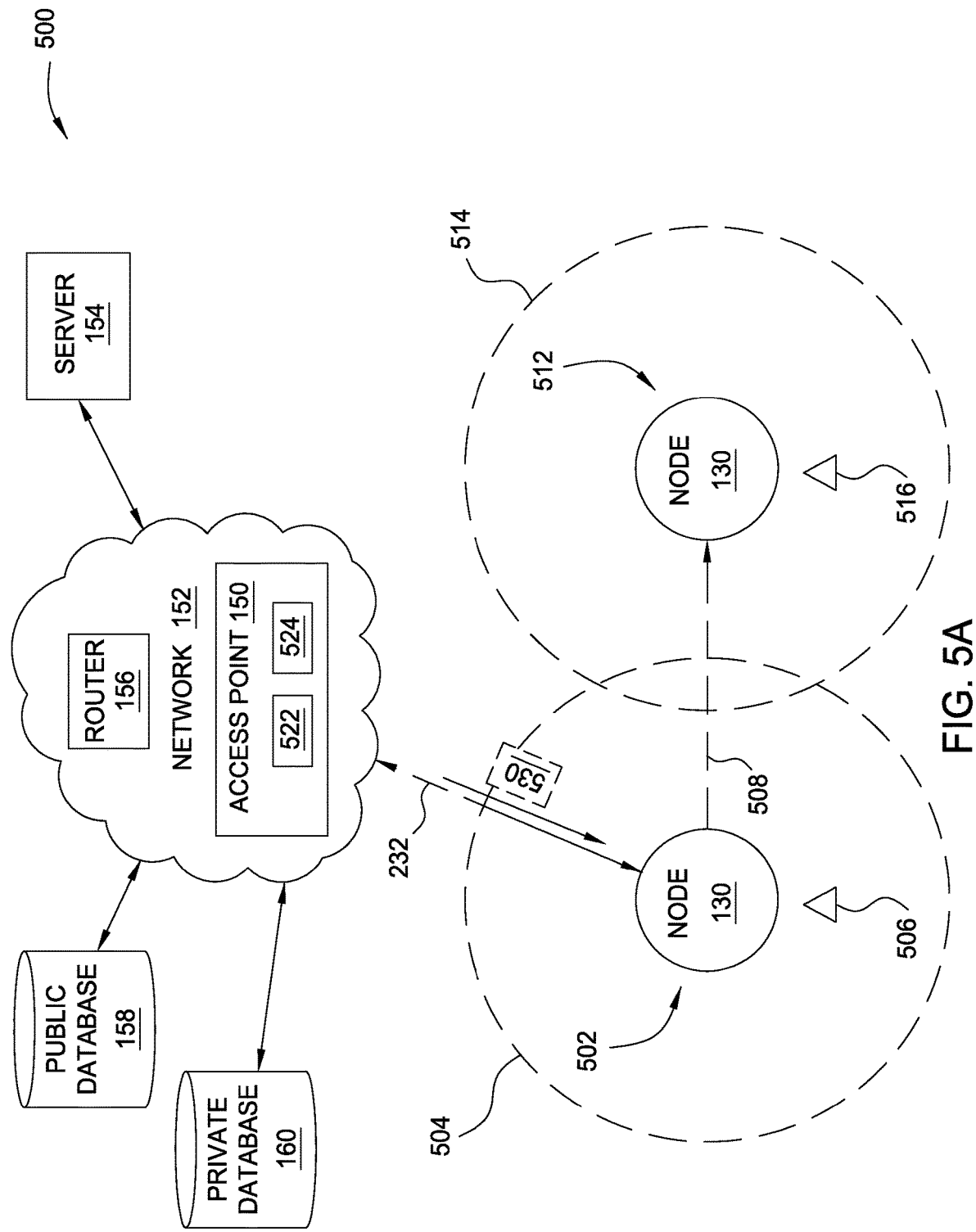

SET OF OPTIMIZATIONS APPLICABLE TO A WIRELESS NETWORKS OPERATING IN TV WHITE SPACE BANDS

CROSS-REFERENCE TO RELATED APPLICATIONS

This application claims the benefit of U.S. provisional patent application titled "A Set of Optimizations Applicable to Wireless Networks Operating in TV White Space Bands," filed on Mar. 14, 2013 and having Ser. No. 61/782,863. The subject matter of this related application is hereby incorporated herein by reference.

BACKGROUND OF THE INVENTION

Field of the Invention

Embodiments of the present invention relate generally to wireless digital communication and, more specifically, to a set of optimizations applicable to wireless networks operating in white space bands.

Description of the Related Art

A conventional wireless network system generally includes a collection of different nodes configured to interoperate with one another. Nodes that reside within a particular physical region may communicate with one another according to a set of channels that are available within that region. For example, if the nodes are configured to communicate on TV white space (TVWS) channels, then the nodes may exchange data with one another across any of the TVWS channels that are available within that region. A node residing within a given region may determine the available channels in that region by querying an access point for a "channel map" that specifies which channels are regionally available.

The approach described thus far is feasible in the simple network configuration described above. However, modern networks have several features that make this approach problematic. In particular, in a modern network, a node may be coupled to multiple different access points, and each access point may provide the node with a different channel map. When a conventional node is presented with conflicting information in this fashion, the node may cease to operate properly and may not be able to fully participate in the network, which could result in low data rates. In addition, modern nodes are capable of travelling between different regions that have different channel availability, and so the channel maps acquired by the node may frequently become obsolete. A given channel map may also become obsolete with time. Consequently, the node may frequently lose network connectivity.

As the foregoing illustrates, what is needed in the art is an improved technique for providing channel maps to devices that operate in a network.

SUMMARY OF THE INVENTION

One embodiment of the present invention sets forth a computer-implemented method for generating a channel map for a node within a network, including acquiring a first channel map that includes a first set of channels on which the node is configured to communicate, acquiring a second channel map that includes a second set of channels on which the node is configured to communicate, combining the first channel map with the second channel map to generate a third channel map, and causing the node to communicate on a channel included in the third channel map.

Advantageously, the node is provided with a single channel map that is consistent across all access points to which the node is coupled and relevant within multiple regions that the node may occupy. Thus, the disclosed techniques may reduce the number of channel maps that must be transmitted to the node, thereby decreasing overall network traffic.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5B illustrate different portions of the network system of FIG. 1 that are configured to generate a channel map based on the predicted position of a node, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
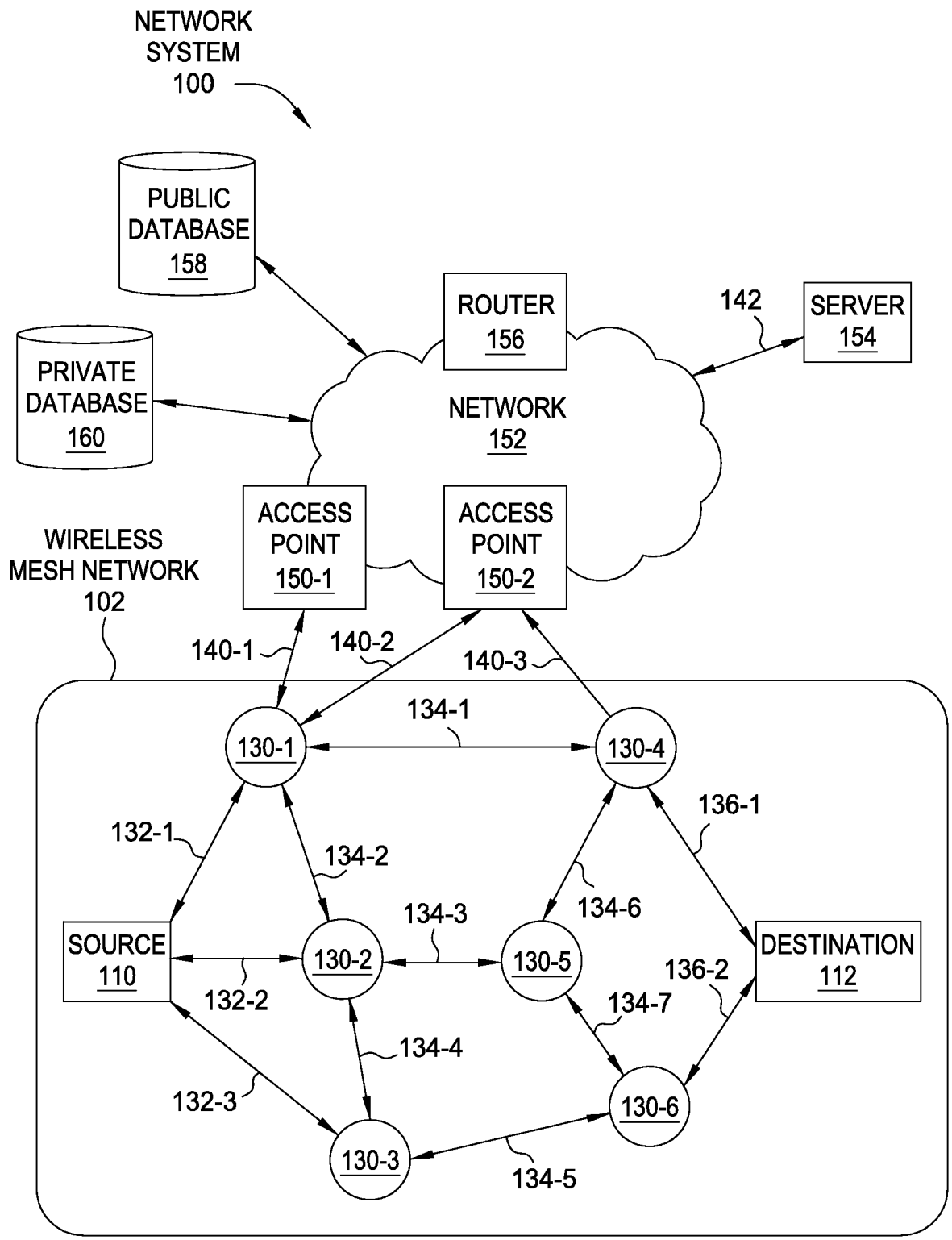
FIG. 1 illustrates a network system, according to one embodiment of the present invention.

FIG. 1 illustrates a network system 100, according to one embodiment of the present invention. The network system 100 includes, without limitation, a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134.

The intermediate nodes 130 communicate with the destination node 112 via communication links 136. The network system 100 may also include one or more access points 150, a network 152, a server 154, a router 156, a public database 158, and a private database 160.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. One skilled in the art will understand that any technically feasible discovery protocol may be implemented without departing from the scope and spirit of embodiments of the present invention.

The discovery protocol may also be implemented to determine the channel hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or IEEE Extended Unique Identifier (EUI) media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

The nodes 130 are configured to communicate with one another on many different channels, although the set of channels available to the nodes 130 may be limited for various reasons. For example, the nodes 130 may reside proximate to a TV tower that transmits on a particular TV channel, and so the nodes 130 may be restricted from communicating on that particular channel. A given node 130 may acquire a list of available channels associated with a region occupied by that node 130 from a public database 158. The public database 158 includes channel availability data for a wide variety of different regions where the node 130 may reside. The node 130 may query the public database 158 directly for the list of available channels, although in practice, the node 130 relies on the server 154 to perform such queries on behalf of the node 130. The node 130 may communicate with the server 154 via one or more of the access points 150. In one embodiment, the public database 158 is a TVWS database that includes a list of available TV channels within various regions.

The node 130 may also acquire a quality of service (QOS) value for each channel that is available in a region where the node 130 may reside. The private database 160 includes channel QOS values for various channels associated with different regions. The node 130 may query the private database 160 directly for QOS values associated with a list of channels, although in practice, the node 130 relies on the server 154 to perform such queries on behalf of the node 130. Again, the node 130 may communicate with the server 154 via one or more of the access points 150. The server 154 may interact with the private database 160 in order to determine the QOS values for each available channel and then select, from the list of available channels, those channels that have a QOS value that is sufficient for the operating requirements of the node 130.

As a practical example of the approach described above, the node 130 could request a channel from the server 154 by transmitting latitude and longitude values associated with the position of the node 130 to the server 154 via access point 150-1. The server 154 could then query the public database 158 with those latitude and longitude values, and, in response, receive a list of available channels associated with that position from the public database 158. The server 154 could also query the private database 160 in order to determine a QOS value for each channel in the list of available channels. The server 154 could then select one or more of the available channels, from the list of available channels, with QOS value that exceed a threshold value. The server 154 could then provide the selected channels to the node 130 by way of access point 150-1.

In various embodiments of the invention, each access point 150 may interact with the server 154 in order to acquire "channel maps" that represent one or more lists of channels associated with one or more regions. A channel map may include a list of available channels associated with just one region, or many lists of channels, where each list corresponds to a different region. A channel map may also include QOS values for available channels, or, alternatively, lists of channels that meet certain criteria, such as, e.g. a minimum QOS value. A channel map may be derived from information stored in public database 158 and/or private database 160. For example, the server 154 may generate a channel map for a collection of different regions by querying the public database 158 for the available channels within each of those different regions. An access point 150 may configure a given node 130 to communicate on a particular channel based on the channel map.

A node 130 may be coupled to more than one access point 150, and, thus, the node 130 may receive more than one channel map from those access points 150. Those channel maps may be different from one another and may present conflicting information to the node 130. A technique for combining different channel maps in order to resolve discrepancies between those channel maps is described below in conjunction with FIGS. 4A-4C and 7.

A node 130 may also travel between regions that are associated with different channel maps. A technique for configuring a traveling node 130 with a channel map that is relevant within the regions traversed by the node 130 is described in greater detail below in conjunction with FIGS. 5A-5B and 8. The two techniques mentioned above may also be combined, as described in greater detail below in conjunction with FIGS. 6A-6C and 9.

In network system 100, an access point 150, such as access point 150-1 or access point 150-2, is configured to communicate with at least one node within the wireless mesh network 102, such as intermediate node 130-1 or 130-4. Communication may include transmission of payload data, timing data, or any other technically relevant data between the access point 150 and the at least one node within the wireless mesh network 102. For example, a communications link 140-1 may be established between the access point 150-1 and intermediate node 130-1 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154. Router 156 may be configured to coordinate communications between the access point 150 and the server 154 across communication link 142.

In one embodiment, the server 154 represents a destination for payload data originating within the wireless mesh network 102 and a source of payload data destined for one or more nodes within the wireless mesh network 102. In another embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In yet another embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting. Exemplary details of server 154 are described in greater detail below in conjunction with FIG. 3.

The techniques described herein are sufficiently flexible to be utilized within any technically feasible network environment including, without limitation, a wide-area network (WAN), a local-area network (LAN), a personal area network (PAN), a TVWS network, a star network, and so forth. Moreover, multiple network types may exist within a given network system 100. For example, communications between two nodes 130 or between a node 130 and the corresponding access point 150 may occur via a radio-frequency local-area network (RF LAN), while communications between access points 150 across the network 152 may occur via a WAN such as a general packet radio service (GPRS). As mentioned above, each node within wireless mesh network 102 includes a network interface that enables the node to communicate wirelessly with other nodes. An exemplary network interface is described below in conjunction with FIG. 2.

Figure 2:
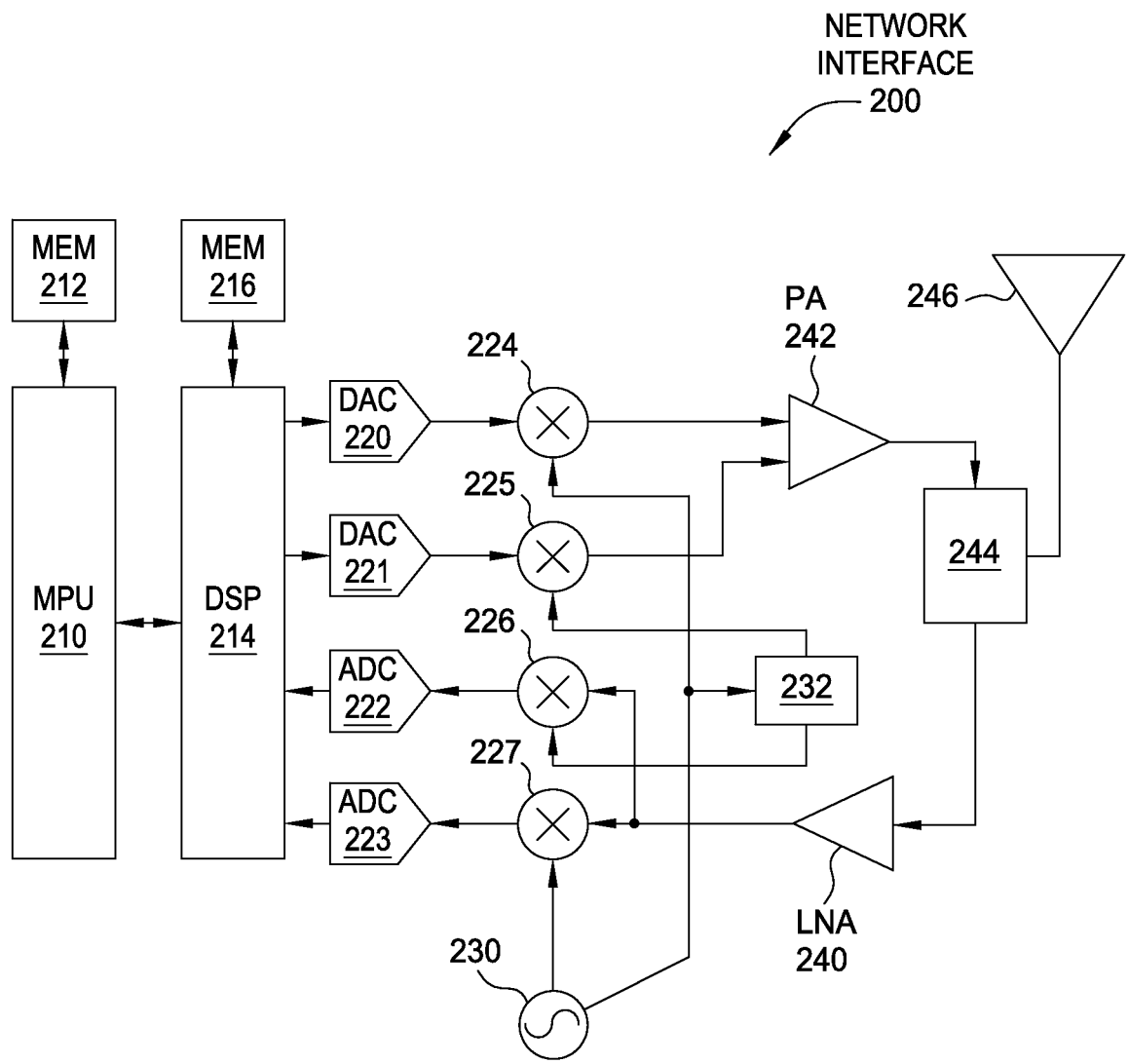
FIG. 2 illustrates a network interface configured to transmit and receive data within a wireless mesh network, according to one embodiment of the present invention.

FIG. 2 illustrates a network interface 200 configured to implement multi-channel operation, according to one embodiment of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220 and 221, analog to digital converters (ADCs) 222 and 223, analog mixers 224, 225, 226, and 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 4-9, when MPU 210 executes a firmware program stored in memory within network interface 200.

The DSP 214 is coupled to DAC 220 and DAC 221. Each DAC 220 and 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222 and 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
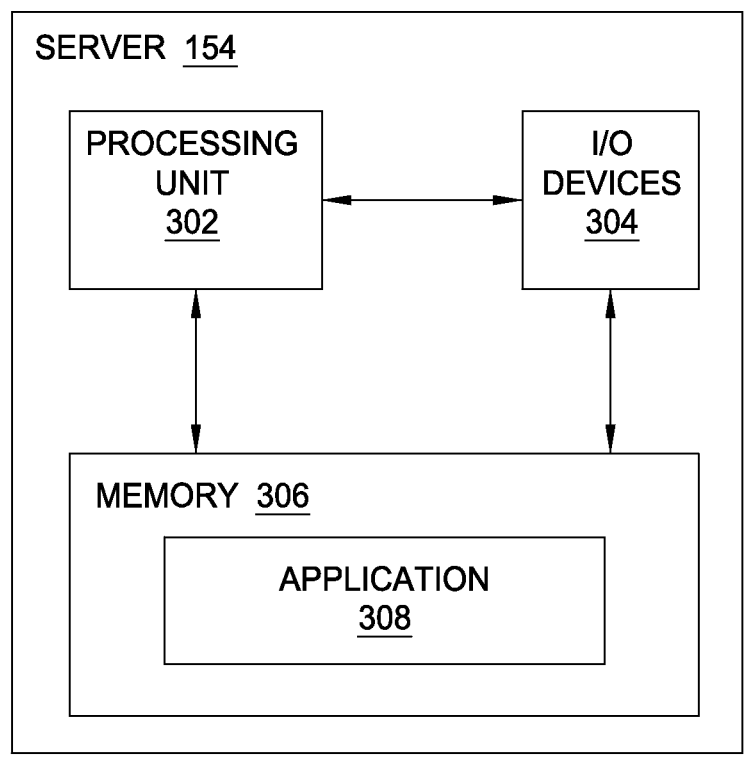
FIG. 3 is a block diagram illustrating the server of FIG. 1, according to one embodiment of the present invention.

FIG. 3 is a block diagram illustrating the server of FIG. 1, according to one embodiment of the present invention. In this particular embodiment, server 154 comprises a computing device capable of processing data by executing program instructions stored in memory. Server 154 may also comprise any type of machine capable of processing data. As shown, server 154 includes, without limitation, a processing unit 302, input/output (I/O) devices 304, and memory 306. As also shown, processing unit 302, I/O devices 304, and memory 306 are coupled to one another.

Processing unit 302 may include one or more central processing unit (CPUs), parallel processing units (PPUs), graphics processing units (GPUs), application-specific integrated circuits (ASICs), field-programmable gate arrays (FPGAs), or any other type of processing unit capable of processing data. In addition, processing unit 302 may include various combinations of processing units, such as, e.g., a CPU coupled to a GPU.

I/O devices 304 may include input devices, such as a keyboard, a mouse, a touchpad, a microphone, a video camera, and so forth, as well as output devices, such as a screen, a speaker, a printer, a projector, and so forth. In addition, I/O devices 304 may include devices capable of performing both input and output operations, such as a touch screen, an Ethernet port, a universal serial bus (USB) port, a serial port, etc. I/O devices 304, as well as processing unit 302 described above, are both configured to read data from and write data to memory 306.

Memory 306 may include a hard disk, one or more random access memory (RAM) modules, a database, and so forth. In general, any technically feasible unit capable of storing data may implement memory 306. Memory 306 includes an application 308 that may be executed by processing unit 302 to perform the various functions of server 154 described herein. Persons skilled in the art will recognize that the block diagram shown in FIG. 3 illustrates just one possible implementation of server 154, and that any system or combination of systems configured to perform the functionality of server 154 described herein falls within the scope of the present invention.

Optimizations for Wireless Networks Operating in TV White Space Bands

Figure 4A:
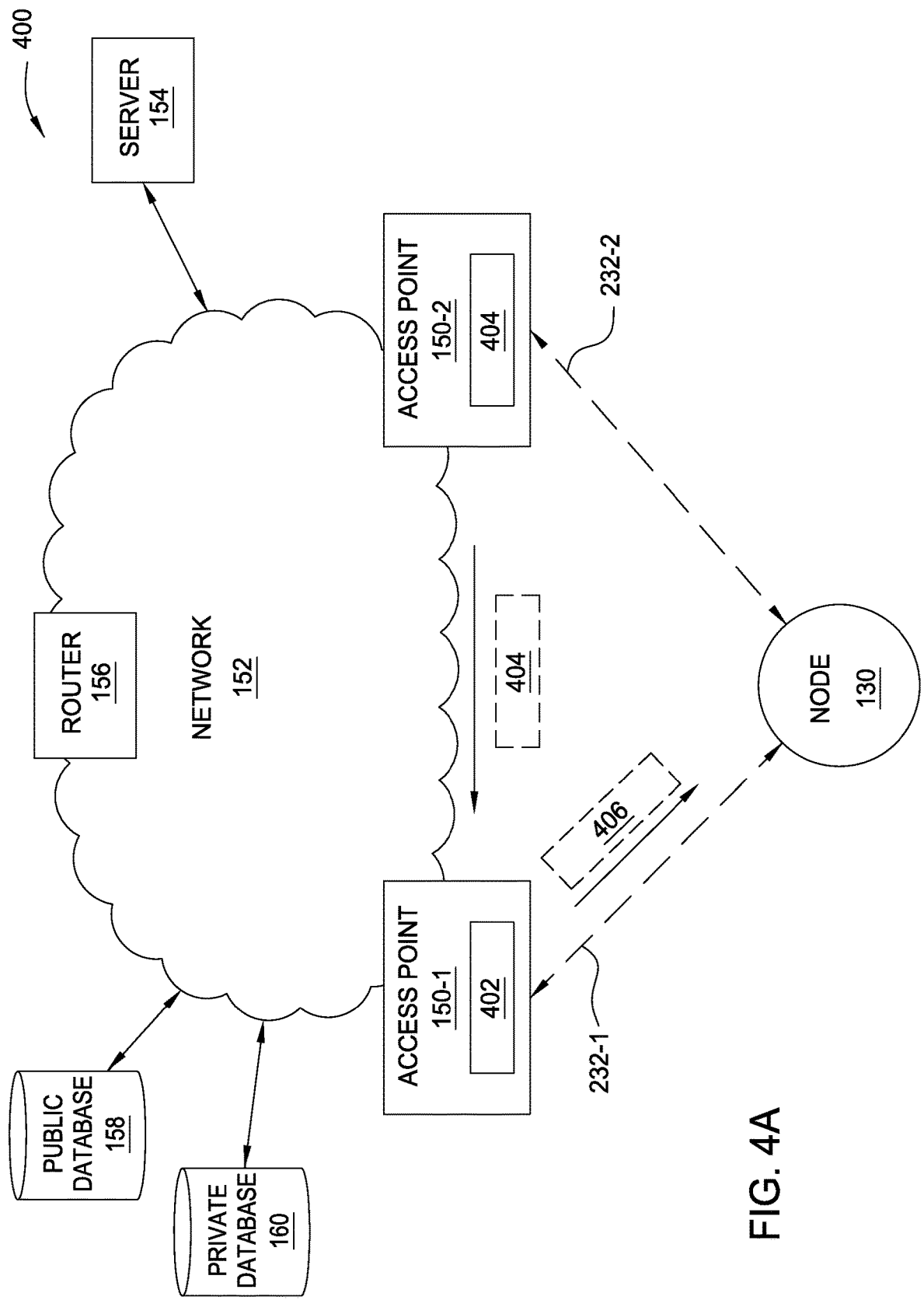
FIGS. 4A-4C illustrate different portions of the network system of FIG. 1 that are configured to combine channel maps associated with different access points, according to various embodiments of the present invention.
Figure 4B:
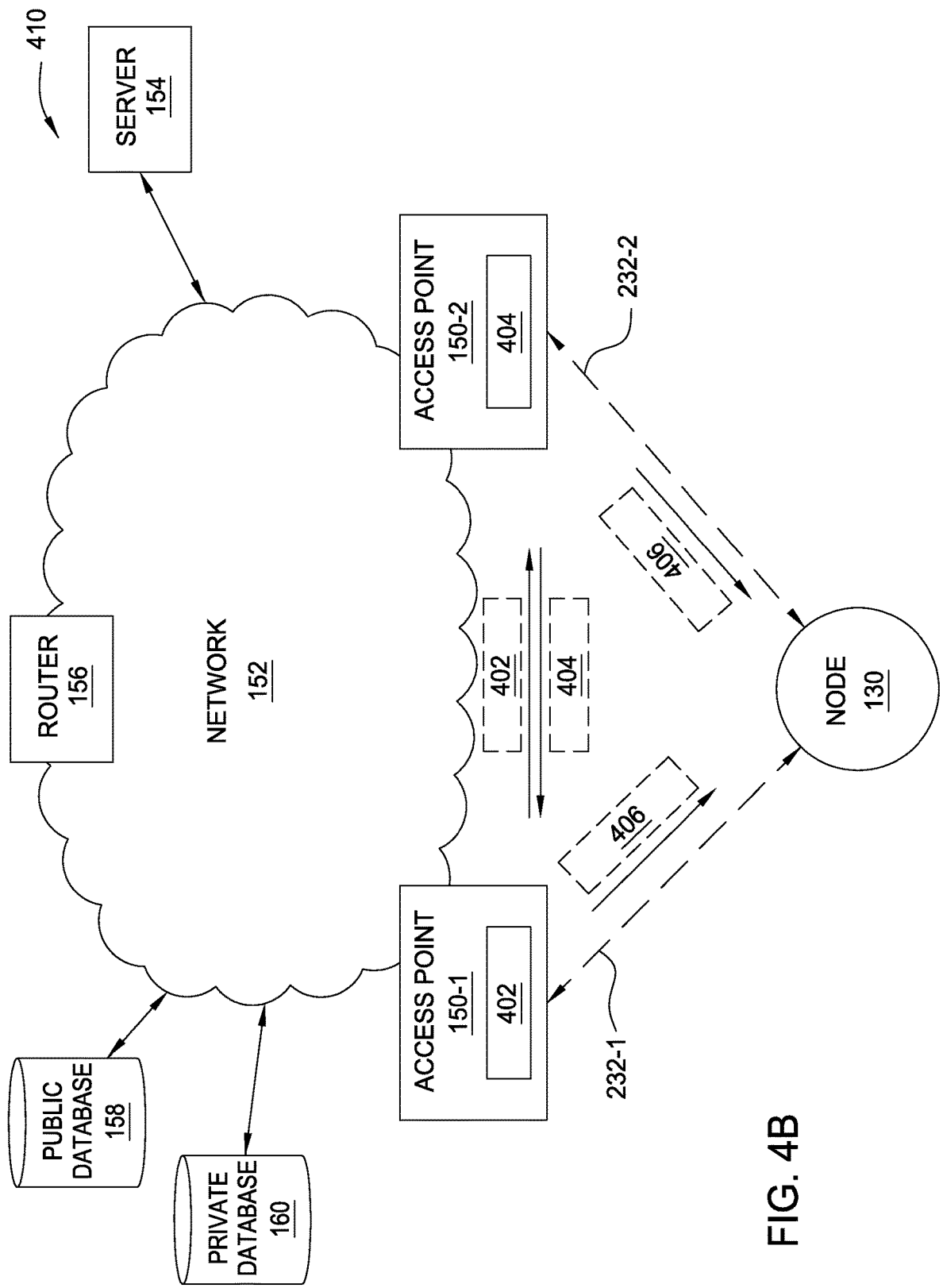
Figure 4C:
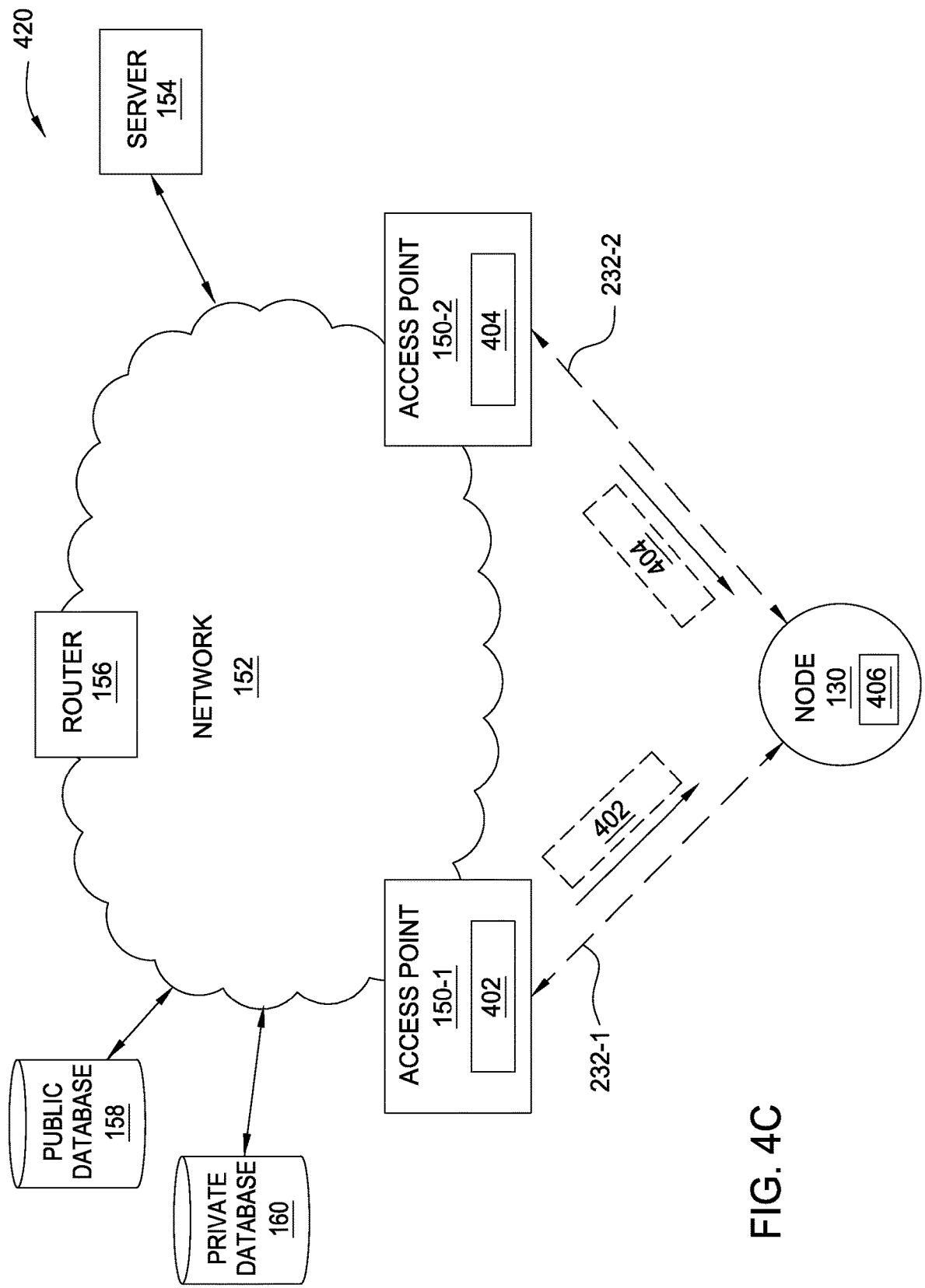

Each of FIGS. 4A-4C illustrates a portion of the network system of FIG. 1 configured to combine channel maps associated with different access points, according to various embodiments of the present invention. FIGS. 4A-4C include some of the same components as those shown in FIG. 1, although certain components have been omitted, for the sake of simplicity, while other components have been added.

FIG. 4A illustrates a portion 400 of the network system 100 of FIG. 1 configured to combine channel maps 402 and 404 associated with access points 150-1 and 150-2, respectively, according to one embodiment of the present invention. As shown, access point 150-1 includes channel map 402 and access point 150-2 includes channel map 404. Access point 150-2 is configured to transmit channel map 404 to access point 150-1, as also shown.

As discussed above in conjunction with FIG. 1, a channel map generally represents one or more lists of channels associated with one or more physical regions. A channel map may be derived from information stored in public database 158 and/or private database 160, and may thus represent one or more lists of available channels, QOS values for those channels, or simply one or more lists of channels with a threshold QOS value. In addition, a channel map may reflect certain constraints associated with the channels associated with a particular region. For example, a channel map could indicate that certain channels are only available during certain periods of time, and may not be available during other intervals of time. Further, the channel map could indicate that particular channels have limited usability, due to, for example, an excessive number of users communicating on those particular channels. As a general matter, the channel maps disclosed herein may reflect a wide variety of characteristics and/or metrics associated with a set of channels.

In FIG. 4A, channel maps 402 and 404 include different lists of channels associated with a region occupied by the node 130. More specifically, channel maps 402 and 404 may represent different lists of available channels, different QOS values for the same set of available channels, or different lists of channels with a high QOS value, among other possibilities. Channel maps 402 and 404 may differ from one another for a wide variety of reasons. For example, access point 150-1 may have acquired channel map 402 more recently than when access point 150-1 acquired channel map 404. Thus, channel map 402 may represent a more current list of channels associated with the region occupied by the node 130. Alternatively, channel map 402 may include QOS values that were computed more recently than QOS values included within channel map 404.

Access point 150-1 is configured to acquire channel map 404 from access point 150-2 and to then combine channel maps 402 and 404 to generate channel map 406, thereby resolving any differences between channel maps 402 and 404. In the context of this disclosure, two channel maps may be "combined" by performing any operation or sequence of operations with those two channel maps in order to generate a third channel map. Upon combining channel maps 402 and 404 to generate channel map 406, access point 150-1 may then transmit channel map 406 to node 130. Node 130 may then communicate with other nodes 130 according to the list of channels included within channel map 406. Access point 150-1 may also transmit channel map 406 to other nodes coupled to node 130, so that those nodes may communicate according to a single, consistent channel map.

Access point 150-1 may combine channel maps 402 and 404 by implementing a wide variety of different techniques. For example, when channel maps 402 and 404 represent different lists of available channels, access point 150-1 could perform an AND operation with channel maps 402 and 404 in order to identify available channels that appear within both of channel maps 402 and 404. Alternatively, access point 150-1 could perform an OR operation with channel maps 402 and 404 in order to identify available channels that appear in either of channel maps 402 and 404. Access point 150-1 could then incorporate the channels resulting from either of these two operations into channel map 406.

In embodiments where channel maps 402 and 404 include QOS values for the various channels included in those channel maps, access point 150-1 may implement more diverse combination techniques. For example, access point 150-1 could AND channel map 402 and 404, similar to above, and then average the QOS values for channels appearing in both of channel maps 402 and 404. Access point 150-1 could then select only the channels that appear in both of channel maps 402 and 404 that have an average QOS value that exceeds a threshold value. The resulting channels could then be incorporated into channel map 406. In this example, instead of averaging corresponding QOS values for corresponding channels, access point 150-1 could also select the minimum QOS value for each corresponding channel. Access point 150-1 could then compare the minimum QOS values to the threshold to identify channels that should be incorporated into channel map 406.

Access point 150-1 may also implement a wide variety of filtering techniques in order to combine channel maps 402 and 404. For example, access point 150-1 could implement a Kalman filter in order to smooth channel maps 402 and 404 into a single channel map 406. Persons skilled in the art will recognize that access point 150-1 may implement any technically feasible approach for generating a single set of data based on two different sets of data in order to generate channel map 406 based on channels maps 402 and 404. Upon combining channel maps 402 and 404 using any of the aforementioned techniques, access point 150-1 transmits channel map 406 to node 130. Node 130 may then transmit channel map 406 to adjacent nodes 130. Access point 150-1 or node 130 may also transmit channel map 406 to other access points 150, thereby precluding the need for further combination of channel maps for a period of time.

Each of access points 150-1 and 150-2 may also implement the techniques described thus far upon exchanging channel maps 402 and 404 with one another, as described in greater detail below in conjunction with FIG. 4B.

FIG. 4B illustrates a portion 410 of the network system 100 of FIG. 1 configured to combine channel maps 402 and 404 associated with access points 150-1 and 150-2, respectively, according to one embodiment of the present invention. As shown, access point 150-1 includes channel map 402 and access point 150-2 includes channel map 404.

Access points 150-1 and 150-2 are configured to exchange channel maps 402 and 404 with one another, as also shown.

Upon receiving channel map 404 from access point 150-2, access point 150-1 may combine channel map 402 with channel map 404 to generate channel map 406. Access point 150-1 may implement any of the techniques described in conjunction with FIG. 4A for combining channel maps. In like fashion, upon receiving channel map 402 from access point 150-1, access point 150-2 may combine channel map 404 with channel map 402 to generate channel map 406. Access point 150-2 generally implements the same combination technique as access point 150-2, and so channel map 406 generate by access point 150-2 is substantially similar to channel map 406 generated by access point 150-1.

Access points 150-1 and 150-2 are configured to transmit channel maps 406 to node 130. Although node 130 receives multiple channel maps from multiple access points 150, those channel maps are essentially the same, and so node 130 is not presented with conflicting information. Node 130 may then communicate with other nodes 130 according to the channels included within channel map 406 and may also transmit channel map 406 to those other nodes 130 or access points 150. Access points 150-1 and 150-2 may also transmit channel map 406 to other access points 150 and to other nodes 130, thereby providing those access points and nodes with a channel map that is consistent across those different devices.

Node 130 may also implement the techniques described thus far upon receiving channel maps 402 and 404 from access points 150-1 and 150-2, respectively, as described in greater detail below in conjunction with FIG. 4C.

FIG. 4C illustrates a portion 420 of the network system 100 of FIG. 1 configured to combine channel maps 402 and 404 associated with access points 150-1 and 150-2, respectively, according to one embodiment of the present invention. As shown, access point 150-1 includes channel map 402 and access point 150-2 includes channel map 404. Access points 150-1 and 150-2 are configured to transmit channel maps 402 and 404, respectively, to node 130. Node 130 is configured to combine channel maps 402 and 404 by implementing any of the aforementioned techniques for combining channel maps. Node 130 may then transmit channel map 406 to adjacent nodes and/or access points 150 to which node 130 is coupled.

In one embodiment, access points 150-1 and 150-2 may transmit to node 130 just the channels within channel maps 402 and 404, respectively, with a QOS value that exceeds a threshold value. With this approach, access points 150 may transmit a reduced amount of information to node 130. Node 130 may then combine these different portions of channels maps 402 and 404 to generate channel map 406.

Referring generally to FIGS. 1 and 4A-4C, any technically feasible device included in the network system 100 may implement the combination techniques described thus far. For example, server 154 may be configured to combine an older version of a particular channel map with a newer version of that channel map and then provide the combined channel map to access points 150. As a general matter, the combination of channel maps represents an operation that may be carried out by any device within the network system of FIG. 1 according to the computational resources associated with those devices.

For example, in network systems such as portion 400 shown in FIG. 1, nodes 130 and access point 150-2 could lack sufficient computational resources to combine channel maps 402 and 404 compared to the computational resources available to access point 150-1. Therefore, access point 150-1 would assume responsibility for combining channel maps 402 and 404. Alternatively, in network systems such as portion 420, nodes 130 may be equipped with sufficient computational resources to combine channel maps, and so each node 130 may assume responsibility for combining any and all received channel maps.

In addition, different devices included in the network system 100 may implement different portions of the techniques described thus far. For example, an access point 150-1 could perform an AND operation with two channel maps to generate a third channel map, as described in conjunction with FIG. 4A. Then, a node 130 could select channels from within the third channel map based on QOS values associated with those channels. Persons skilled in the art will recognize that the techniques described in conjunction with FIGS. 4A-4C may be combined and/or distributed in any technically feasible fashion.

In some situations, a node 130 may be included within a mobile device, such as a cellular phone or tablet computer. Accordingly, the node 130 may travel through many different regions with widely varying channel availability and channel QOS values. In order to provide the node 130 with a channel map that is relevant within those different regions, access points 150 and/or nodes 130 may implement the techniques described below in conjunction with FIG. 5.

Figure 5B:
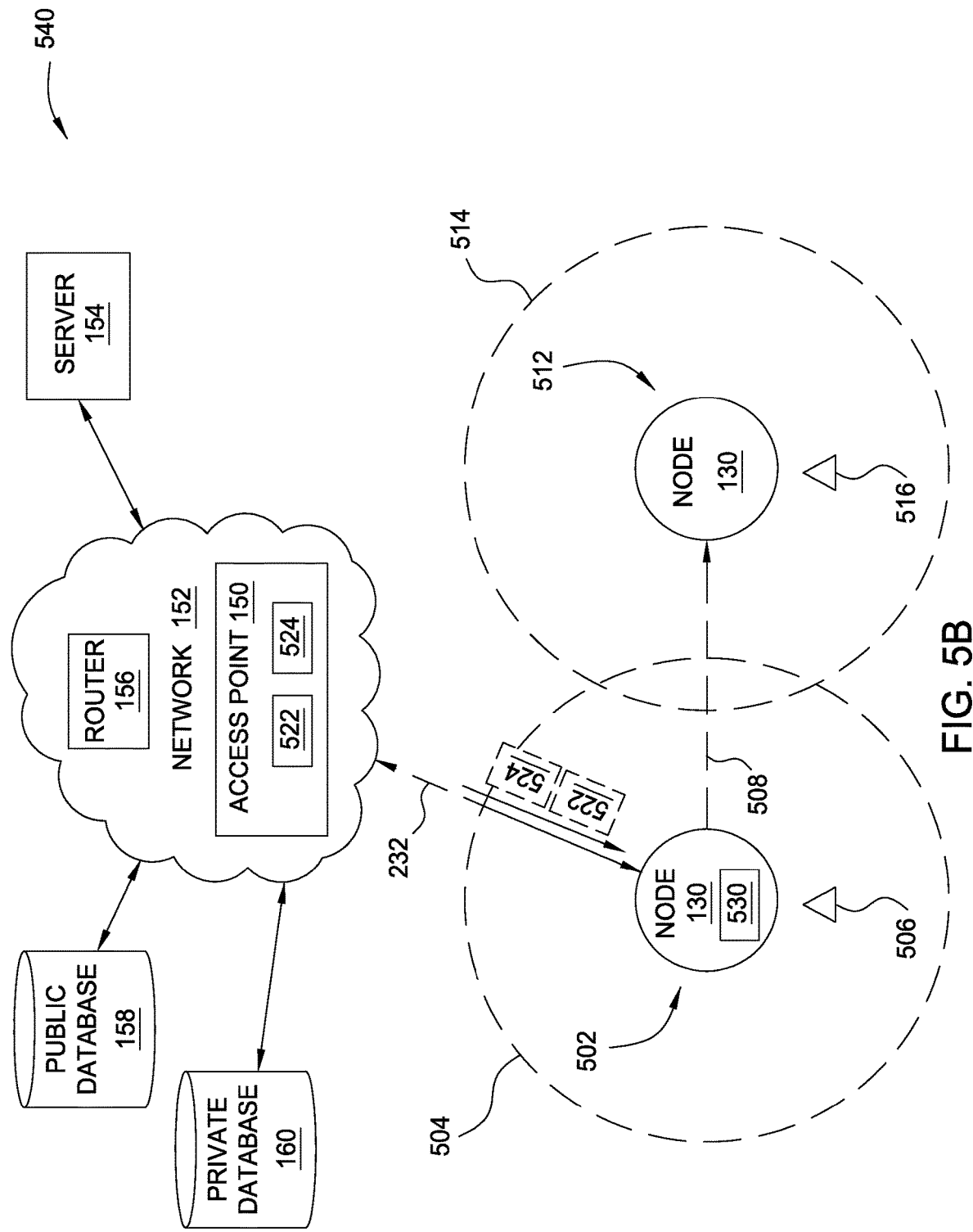

Each of FIGS. 5A-5B illustrates a portion of the network system of FIG. 1 that is configured to generate a channel map based on the predicted position of a node, according to various embodiments of the present invention. FIGS. 5A-5B include some of the same components as those shown in FIGS. 1 and 4A-4C, although certain components have been omitted, for the sake of simplicity, while other components have been added.

FIG. 5A illustrates a portion 500 of the network system of FIG. 1 that is configured to generate a channel map 530 based on the predicted position of node 130, according to one embodiment of the present invention. As shown, node 130 resides at a position 502 within a region 504. Region 504 may represent any arbitrary space, such as a geographical region, a region within which certain laws apply, a region associated with a protected user, and so forth. In one embodiment, region 504 is defined by a boundary within which a TV tower 506 is authorized to operate on a first TV channel with a given power level. In FIG. 5, node 130 resides within region 504 at a time t0. However, the location of node 130 is not fixed, and node 130 may traverse from region 504 along path 508 to another region 514. Within region 514, node 130 may reside at a position 512 at a future time t1.

Access point 150 is configured to analyze the movements of node 130 and to predict the future position of node 130 at various future times. In particular, access point 150 is configured to predict that, at time t1, node 130 will reside at position 512 within region 514. Access point 150 may implement any technically feasible approach for predicting the movements of node 130. For example, access point 150 could record the position of node 130 at various times and estimate the velocity of node 130 in a certain direction, and then extrapolate the position of node 130 based on the estimated velocity of node 130. Persons skilled in the art will recognize that may other techniques for predicting the position of a moving object are known in the art, and that access point 150 may implement any of those existing techniques.

Access point 150 is also configured provide a channel map 530 to node 130 that is associated with both regions 504 and 514 and indicates channels that are available within both of those regions. Channel map 530 may also indicate QOS values for the various channels in channel map 530. Node 130 may then rely on channel map 530 while residing within either region 504 or region 514. Consequently, node 130 may not need to acquire a new channel map upon leaving region 504 and entering region 514. Additionally, if node 130 selects a channel on which to communicate from channel map 530, then node 130 may not need to change channels when traversing between regions 504 and 514, because any selected channel should be available within both of those regions.

Access point 150 is configured to generate channel map 530 by first acquiring channel map 522 that is associated with region 504 and valid at time t0. Upon predicting that node 130 will reside within region 514 at time t1, access point 150 may then acquire a channel map 524 that is associated with region 514 and valid at time t1. Access point 150 may then combine channel map 522 with channel map 524 to generate channel map 530. Access point 150 could, for example, perform an AND operation with channel maps 522 and 524 to identify channels that are included within both such channel maps. Access point 150 could also identify channels to include within channel map 530 based on the QOS values of channels that appear in both of channel maps 522 and 524. Generally, access point 150 may combine channels maps 522 and 524 by implementing any of the combination techniques described above in conjunction with FIGS. 4A-4C.

Node 130 is also configured to implement the combination technique described above, as described in greater detail below in conjunction with FIG. 5B.

FIG. 5B illustrates a portion 540 of the network system of FIG. 1 that is configured to generate a channel map 530 based on the predicted position of node 130, according to one embodiment of the present invention. As shown, access point 150 is configured to transmit channel maps 522 and 524 to node 130. Node 130 may then combine channel maps 522 and 524 to generate channel map 530. Node 130 may implement any of the channel map combination techniques described thus far in order to generate channel map 530.

Referring generally to FIGS. 5A and 5B, access point 150, node 130, or any other device within the network system 100 may combine channel maps associated with any number of different regions that node 130 may occupy. For example, access point 150 could predict that node 130 will traverse three separate regions during three different time intervals, and then acquire channel maps associated with those three regions. Access point 150 could then combine those three channel maps and provide the combined channel map to node 130.

The techniques described above in conjunction with FIGS. 4A-4C and 5A-5B may also be implemented in concert with one another, as described in greater detail below in conjunction with FIG. 6A-6C.

Figure 6A:
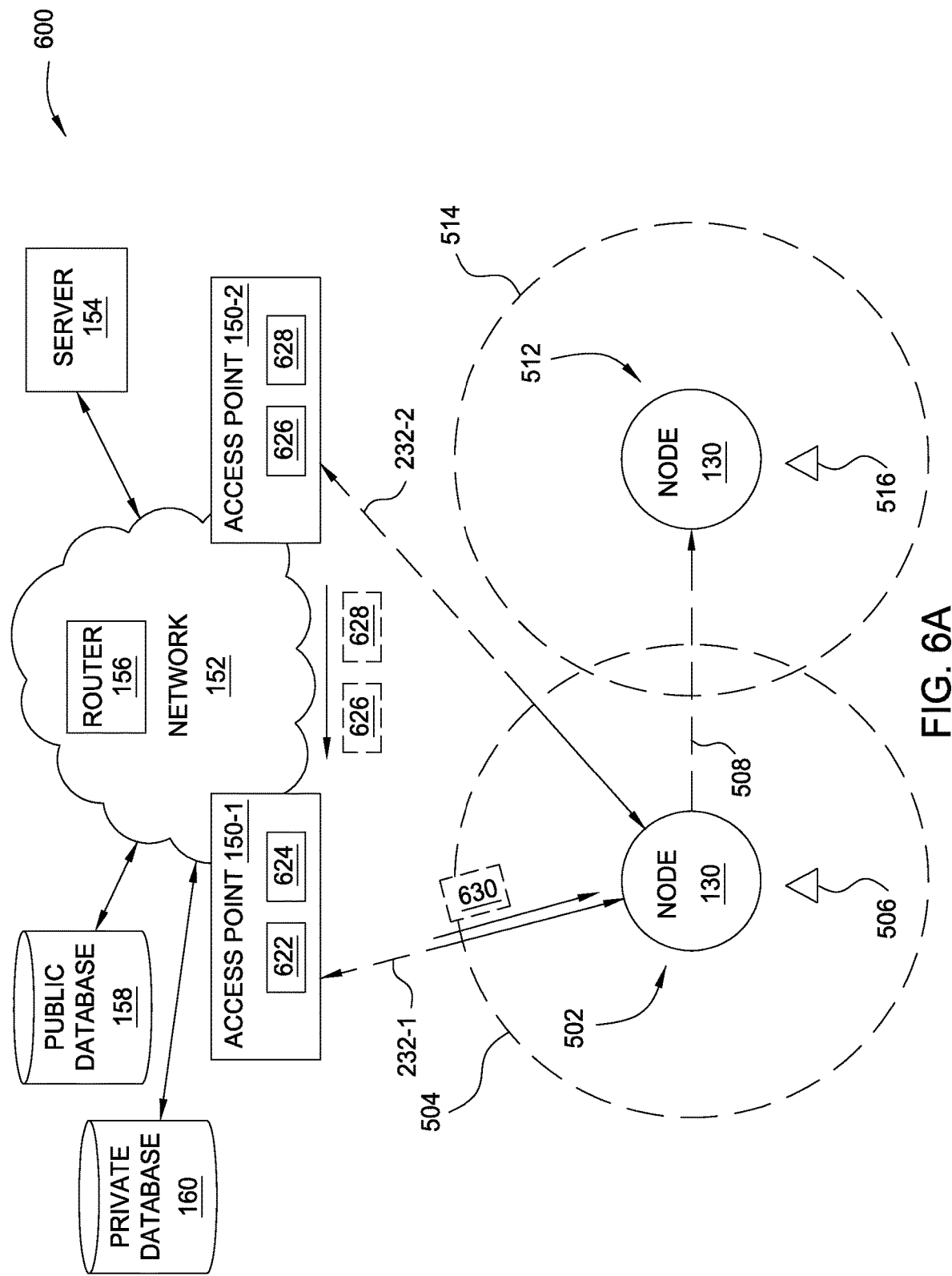
FIGS. 6A-6C illustrate different portions of the network system of FIG. 1 that are configured to combine different channel maps associated with various positions of a node, according to various embodiments of the present invention.
Figure 6B:
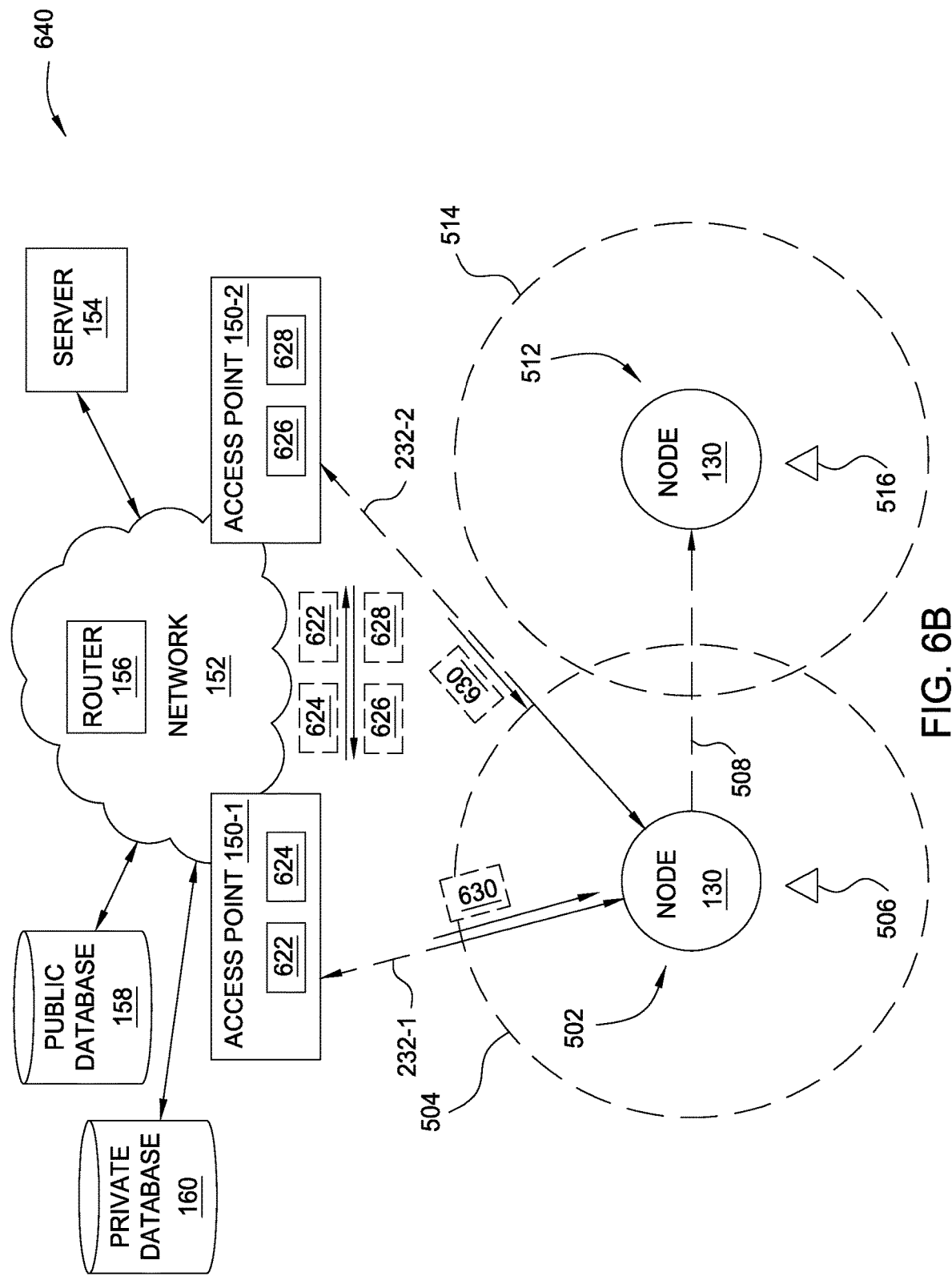
Figure 6C:
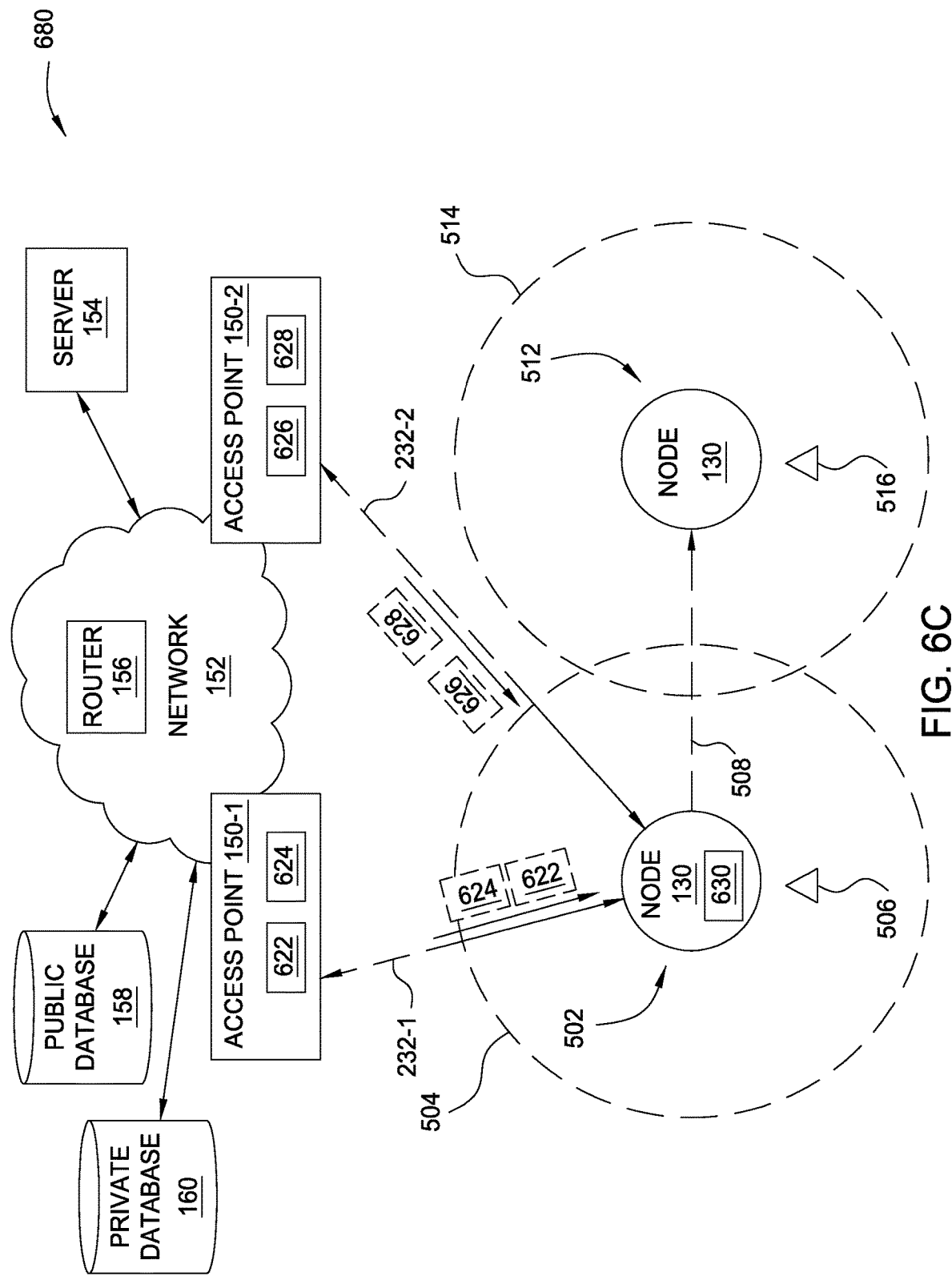

Each of FIGS. 6A-6C illustrates a portion of the network system 100 of FIG. 1 configured to combine different channel maps associated with various positions of a node, according to various embodiments of the present invention. FIGS. 6A-6C include some of the same components as those shown in FIGS. 1, 4A-4C, and 5A-5B, although certain components have been omitted, for the sake of simplicity, while other components have been added.

FIG. 6A illustrates a portion 600 of the network system 100 of FIG. 1 configured to combine different channel maps associated with various positions of node 130, according to one embodiment of the present invention. As shown, portion 600 includes access points 150-1 and 150-2. Node 130 is coupled to both access point 150-1 and access point 150-2. Access point 150-1 includes channel maps 622 and 624. Access point 150-2 includes channel maps 626 and 628.

Channel map 622 within access point 150-1, and channel map 626 within access point 150-2, both include lists of channels associated with region 504. Those channel maps may also include QOS values and/or other metrics that characterize channels associated with region 504. However, channel maps 622 and 626 are different from one another and therefore include different lists of channels. Channel maps 622 and 626 may differ from one another, for example, because one of those channel maps was generated at a different time than the other channel map. Access points 150-1 and 150-2 may acquire channels maps 622 and 626, respectively, upon determining that node 130 resides within region 504 at a current time t0.

Similarly, channel map 624 within access point 150-1, and channel map 628 within access point 150-2, both include lists of channels associated with region 514. Those channel maps may also include QOS values and/or other metrics that characterize channels associated with region 514. However, like channel maps 622 and 626, channel maps 624 and 628 are different from one another and therefore include different lists of channels. Access points 150-1 and 150-2 may acquire channels maps 624 and 628, respectively, upon predicting that node 130 may reside within region 514 at a future time t1.

Access points 150-1 and 150-2 are configured to operate in conjunction with one another to resolve any differences between those different channel maps. Access points 150-1 and 150-2 may combine different channel maps associated with the same region, and may also combine different channel maps associated with different regions. In doing so, access point 150-2 is configured to transmit channel maps 626 and 628 to access point 150-1. Access point 150-1 may then combine channel maps 622, 624, 626, and 628 the generate channel map 630.

Access point 150-1 may implement any of the channel map combination techniques described thus far, in any order and with any pair of channel maps to generate combined channel maps. For example, access point 150-1 could combine channel maps 622 and 626 to generate a first combined channel map, and then combine channel maps 624 and 628 to generate a second combined channel map. Access point 150-1 could then combine the first combined channel map with the second combined channel map to generate channel map 630. Persons skilled in the art will recognize that any approach to combining channel maps 622, 624, 626, and 628 falls within the scope of the present invention.

With the approach described herein, access points 150-1 and 150-2 are configured to provide node 130 with a channel map that is (i) consistent between access points 150-1 and 150-2 and (ii) incorporates channels that are available in both of the regions 504 and 514.

Each of access points 150-1 and 150-2 may also implement the techniques described thus far upon exchanging channel maps with one another, as described in greater detail below in conjunction with FIG. 6B.

FIG. 6B illustrates a portion 640 of the network system 100 of FIG. 1 configured to combine different channel maps associated with various positions of a node 130, according to one embodiment of the present invention. As shown, access point 150-1 is configured to transmit channel maps 622 and 624 to access point 150-2, and access point 150-2 is configured to transmit channel maps 626 and 628 to access point 150-1.

Access point 150-1 may then combine channel maps 622, 624, 626 and 628 to generate channel map 630. Access point 150-1 then transmits channel map 630 to node 130. By implementing a similar approach, access point 150-2 is configured to combine channel maps 622, 624, 626 and 628 to generate channel map 630. Access points 150-2 then transmits channel map 630 to node 130. Since access points 150-1 and 150-2 implement a similar approach to combining channel maps, those access points 150 may independently generate essentially the same channel map 630.

Node 130 may also implement the techniques described thus far upon receiving channel maps 622 and 624 from access point 150-1 and channel maps 626 and 628 from access point 150-2, as described in greater detail below in conjunction with FIG. 6C.

FIG. 6C illustrates a portion 680 of the network system 100 of FIG. 1 configured to combine different channel maps associated with various positions of a node 130, according to one embodiment of the present invention. As shown, access point 150-1 is configured to transmit channel maps 622 and 624 to node 130, and access point 150-2 is configured to transmit channel maps 626 and 628 to node 130. Node 130 is configured to combine those different channel maps to generate channel map 630. Node 130 may then transmit channel map 630 to adjacent nodes and/or access points 150 to which node 130 is coupled.

Persons skilled in the art will recognize that any of the approaches described thus far may be implemented in conjunction with one another. For example, access points 150-1 and 150-2 may be configured to combine channel maps 622 and 626 with one another and provide a combined channel map to node 130. Node 130 may then acquire channel maps 624 and 628 (e.g. from server 154 or from another source) and then merge those channel maps with the combined channel map received from access points 150-1 and 150-2. Any and all such combinations fall within the scope of the present invention. Persons skilled in the art will also recognize that the techniques described herein may be implemented to combine any number of different channel maps. In addition, as previously mentioned, any technically feasible approach for combining channel maps also falls within the scope of the invention, and any such approach may be implemented by any device included within the network system 100.

In addition, persons skilled in the art will recognize that the approaches described thus far may be implemented with any type of white space network, and, more generally, with any technically feasible class of network. For example, nodes 130, access points 150, server 154, and other devices described herein may reside within a star network or personal area network (PAN) and implement the different approaches described herein. Further, those devices may reside within a network having a tiered priority system (a tiered network) and generate, or otherwise acquire, channel maps that account for the priorities of other devices within the network. In a tiered network, high-priority devices may have a higher transmit power, or more relaxed out-of-band transmit rules compared to nodes 130. The priorities of the different devices in the network may be derived from specific licensing agreements that regulate the operation of those devices. A tiered network could be, for example, a network compliant with the T108 network in Japan. In the context of a T108 network, a node could generate, or otherwise acquire, a channel map that accounts for the priorities of other devices in that T108 network.

The various techniques described above in conjunction with FIGS. 1-6C are also described in greater detail below in conjunction with FIGS. 7-9.

Figure 7:
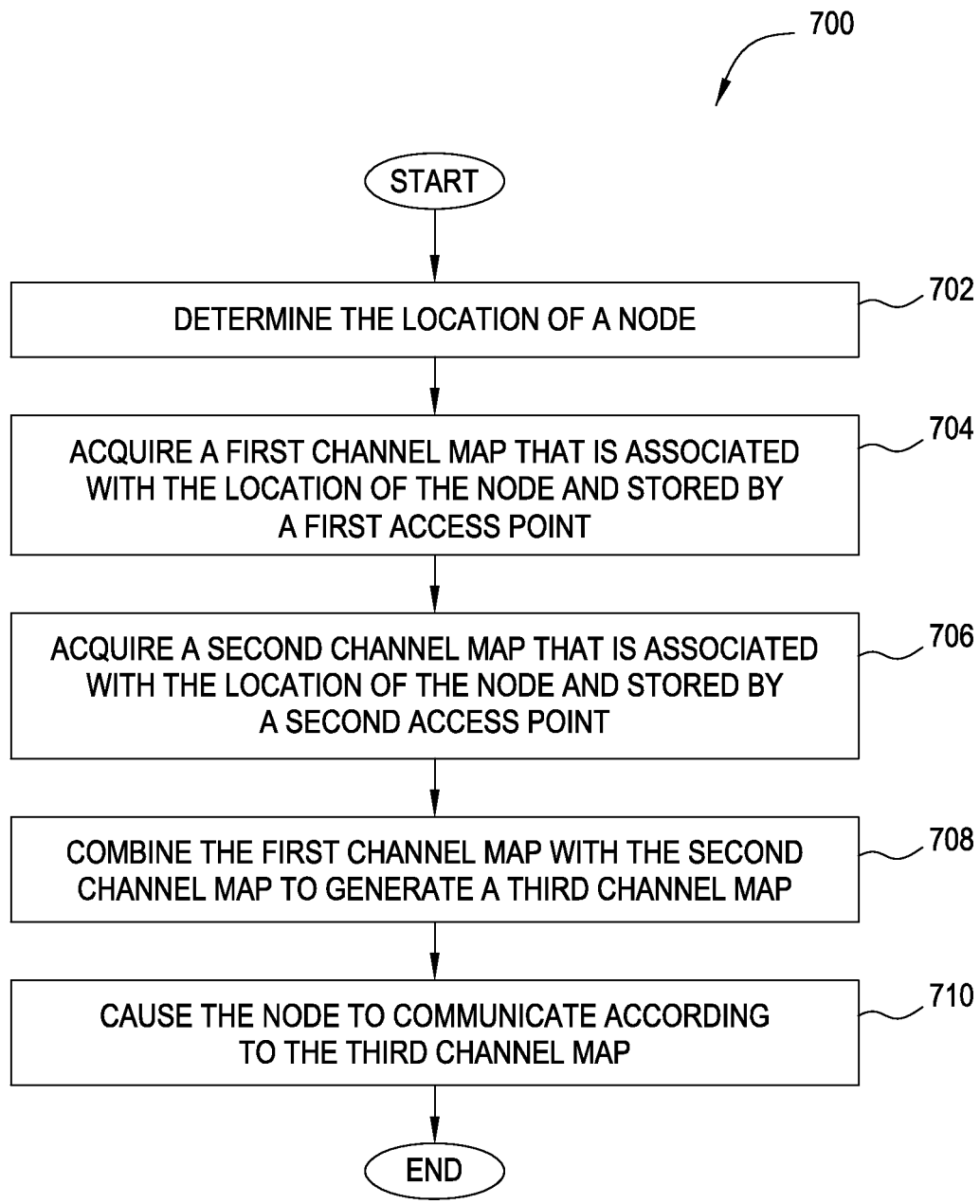
FIG. 7 is a flow diagram of method steps for combining different channel maps, according to one embodiment of the present invention.

FIG. 7 is a flow diagram of method steps for combining different channel maps, according to one embodiment of the present invention. Although the method steps are described in conjunction with the systems of FIGS. 1-6C, persons skilled in the art will understand that any system configured to perform the method steps, in any order, is within the scope of the present invention.

As shown, a method 700 begins at step 702, where access point 150-1 determines the location of node 130. Node 130 could, for example, report that location to access point 150, or access point 150 could track the movements of node 130, among other possibilities. At step 704, access point 150-1 acquires channel map 402 that corresponds to the location of node 130. Channel map 402 includes a list of channels that are available at the location of node 130 and may also include QOS values for those channels. Access point 150-1 may acquire channel map 402 from public database 158, private database 160, server 154, or any other location.

At step 706, access point 150-1 acquires channel map 404 that corresponds to the location of node 130 and is associated with access point 150-2. Access point 150-1 may acquire channel map 404 directly from access point 150-2, as shown in FIG. 4A. Channel maps 402 and 404 are both associated with the location of node 130, however, those channel maps may differ from one another for a variety of reasons. For example, channel map 402 could have been generated after channel map 404, and could thus represent a more current list of channels associated with the position of node 130.

At step 708, access point 150-1 combines channel map 402 with channel map 404 to generate channel map 406. Access point 150-1 may implement any technically feasible approach for combining different sets of data, including performing an AND operation with channel maps 402 and 404, among other possible techniques. At step 710, access point 150-1 causes node 130 to operation according to channel map 406. For example, access point 150-1 could transmit channel map 406 to node 130, as shown in FIG. 4A. The method 700 then ends.

By implementing the method 700, access point 150-1 may combine different channel maps associated with location of node 130, thereby reconciling conflicting information that may be present within those different channel maps. Although the method 700 has been described as being performed by access point 150-1, as shown in FIG. 4A, the method 700 may also be performed by both access points 150-1 and 150-2, as described above in conjunction with FIG. 4B, or by node 130 itself, as described above in conjunction with FIG. 4C.

Figure 8:
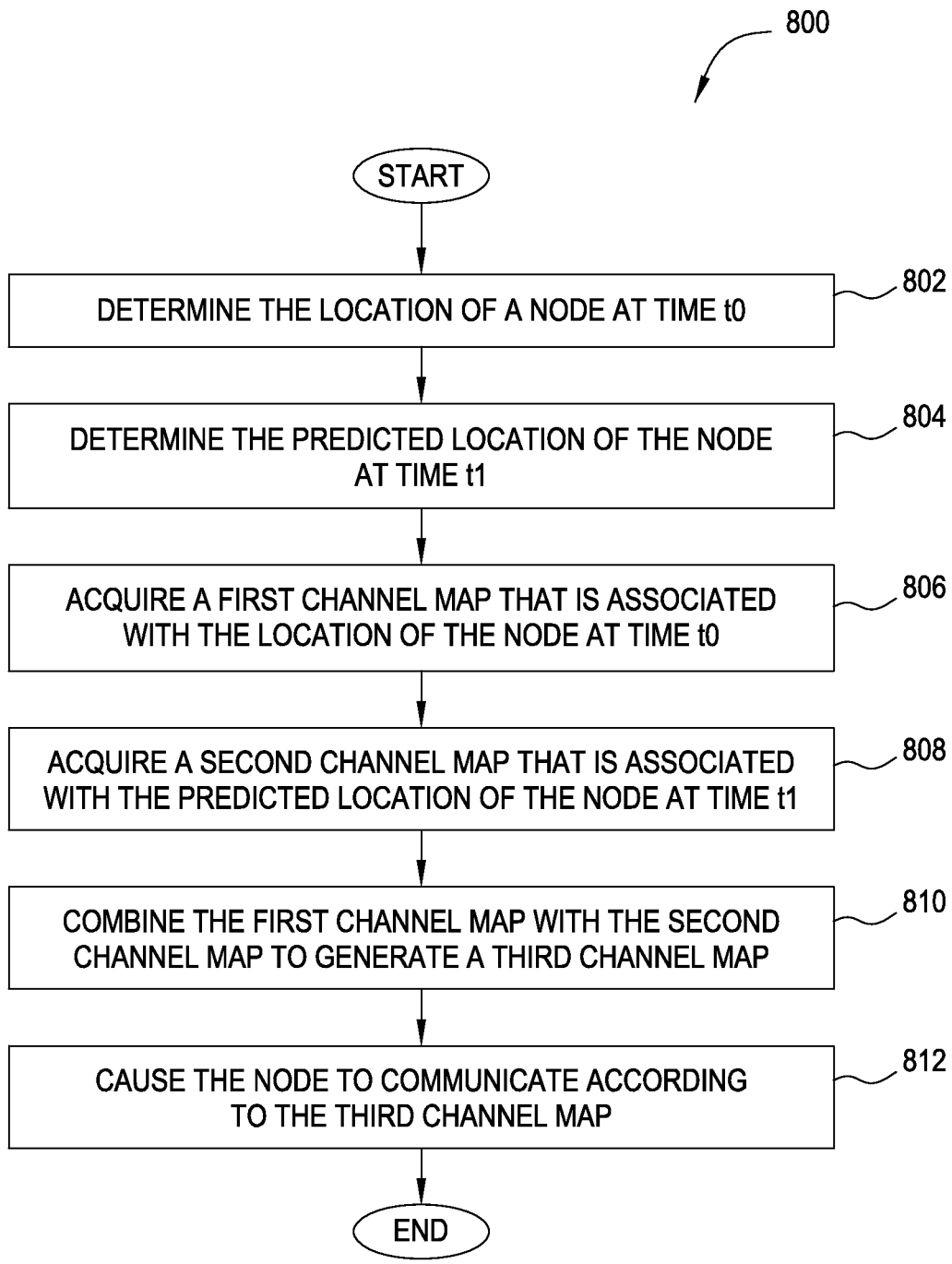
FIG. 8 is a flow diagram of method steps for generating a channel map based on the predicted position of a node, according to one embodiment of the present invention.

FIG. 8 is a flow diagram of method steps for generating a channel map for the predicted position of a node, according to one embodiment of the present invention. Although the method steps are described in conjunction with the systems of FIGS. 1-6C, persons skilled in the art will understand that any system configured to perform the method steps, in any order, is within the scope of the present invention.

As shown, a method 800 begins at step 802, where access point 150 determines the location of node 130 at time t0. At time t0, node 130 resides within region 504, as shown in FIG. 5A. At step 804, access point 150 determines the predicted location of node 130 at time t1. At time t1, node 130 may reside within region 514, as also shown in FIG. 5A. Access point 150 may predict the future location of node 130 by aggregating position information associated with node 130 and then extrapolating that position information. For example, access point 150 could determine the velocity of node 130 in a certain direction, and then determine the distance that will be traveled by node 130 in that direction over a time interval given by t1 minus t0.

At step 806, access point 150 acquires channel map 522 that corresponds to region 504 and is valid at time t0. Access point 150 may retrieve channel map 522 from public database 158 or private database 160, or acquire channel map 522 by interacting with server 154, among other possibilities. At step 808, access point 150 acquires channel map 522 that corresponds to region 514 and is valid at time t1. Similarly, access point 150 may retrieve channel map 524 from public database 158 or private database 160, acquire channel map 524 by interacting with server 154, and so forth.

At step 810, access point 150 combines channel map 522 with channel map 524 to generate channel map 530. Channel map 530 is associated with both regions 504 and 514 and indicates channels that are available within both of those regions. Channel map 530 may also indicate a collection of QOS values. Access point 150 may combine channel maps 522 and 524 by implementing any of the channel map combination techniques described thus far.

At step 812, access point 150 causes node 130 to operate according to channel map 530. The method 800 then ends. Node 130 may then rely on channel map 530 while residing within either region 504 or region 514. Consequently, node 130 may not need to acquire a new channel map upon leaving region 504 and entering region 514. Additionally, if node 130 selects a channel on which to communicate from channel map 530, then node 130 may not need to change channels when traversing between regions 504 and 514, because any selected channel should be available within both of those regions.

By implementing the method 800, access point 150 may combine channel maps associated with the current location of node 130 as well as the predicted location of node 130 at a future time, thereby reducing the number of channel maps that must be transmitted to node 130. Although the method 800 has been described as being performed by access point 150, as shown in FIG. 5A, the method 800 may also be performed by node 130, as described above in conjunction with FIG. 5B.

Figure 9:
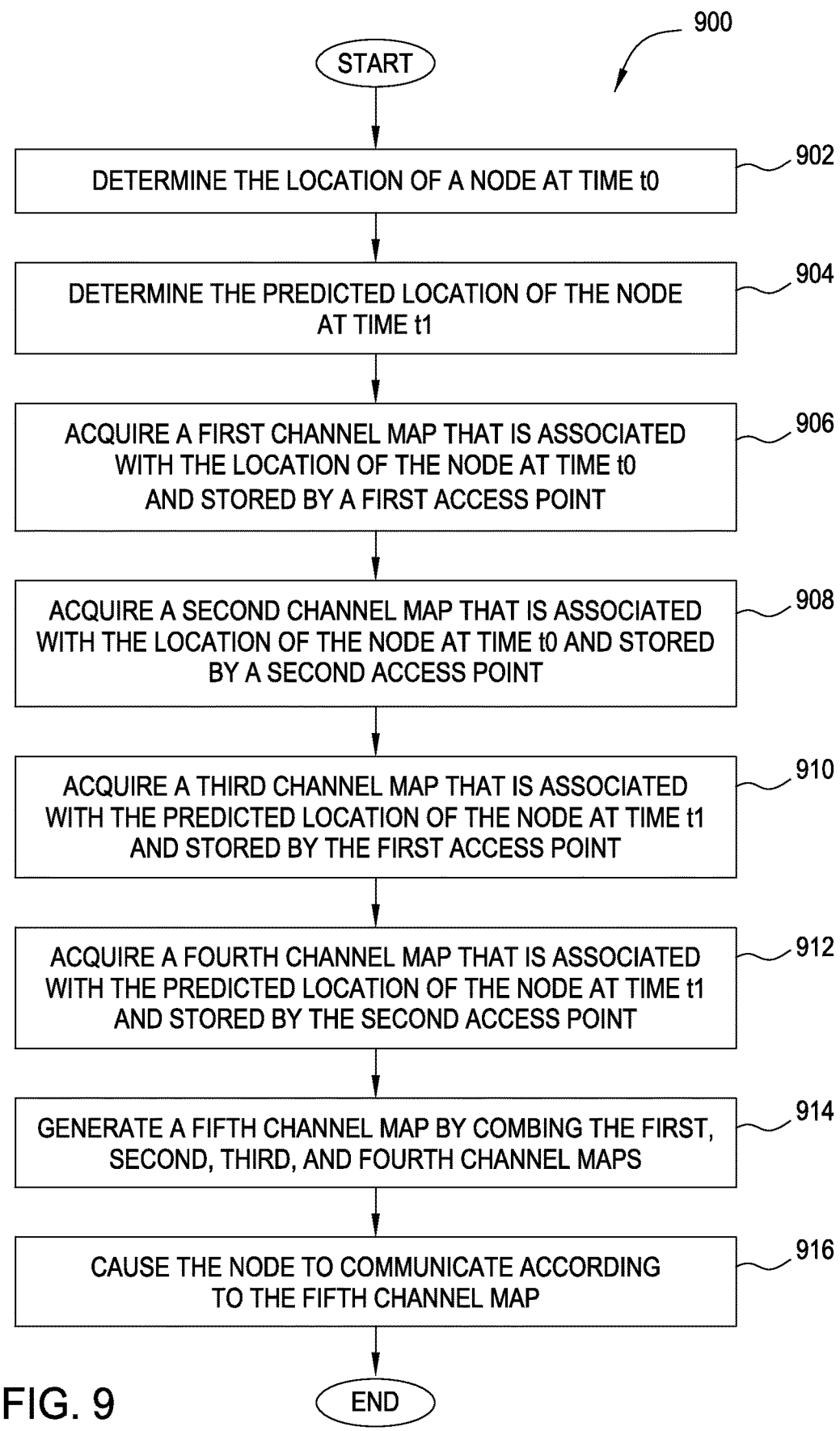
FIG. 9 is a flow diagram of method steps for combining different channel maps based on the predicted position of a node, according to one embodiment of the present invention.

FIG. 9 is a flow diagram of method steps for combining different channel maps associated with the predicted position of a node, according to one embodiment of the present invention. Although the method steps are described in conjunction with the systems of FIGS. 1-6C, persons skilled in the art will understand that any system configured to perform the method steps, in any order, is within the scope of the present invention.

As shown, a method 900 begins at step 902, where access point 150-1 determines the location of node 130 at time t1. At time t1, node 130 resides within region 504, as shown in FIG. 6A. Access point 150-2 may also determine the location of node 130 at time t0 by performing step 902. At step 904, access point 150-1 determines the predicted location of node 130 at time t1. At time t1, node 130 may reside within region 514, as shown in FIG. 6A. Access point 150-2 may also determine the predicted location of node 130 at time t1 by performing step 904.

At step 906, access point 150-1 acquires channel map 622 that corresponds to region 504 and is valid at time t0. At step 908, access point 150-1 acquires channel map 624 that corresponds to region 514 and is valid at time t1. Access point 150-1 may query public database 158 or private database 160 for channel maps 622 and 624, or may communicate with server 154 in order to cause server 154 to retrieve those maps from those different databases.

At step 910, access point 150-1 acquires channel map 626 from access point 150-2. Channel map 626 corresponds to region 504 and is valid at time t0, yet is different from channel map 622, which also corresponds to region 504 and similarly valid. Channel maps 622 and 626 could have been generated at different times, or could be different for a variety of other reasons. At step 912, access point 150-1 acquires channel map 628 from access point 150-2. Channel map 628 corresponds to region 514 and is valid at time t1, yet is different from channel map 624, which also corresponds to region 514 and is similarly valid. Similar to channel maps 622 and 626, channel maps 624 and 628 could have been generated at different times, or could be different for a variety of other reasons.

At step 914, access point 150-1 combines channel maps 622, 624, 626, and 628 to generate channel map 630. Access point 150-1 may implement any channel map combination technique described herein. At step 916, access point 150-1 causes node 130 to operate according to channel map 630. The method 900 then ends. Channel map 630 is consistent between access points 150-1 and 150-2 and also incorporates channels that are available in both of the regions 504 and 514.

By implementing the method 900, access point 150-1 may resolve discrepancies between different channel maps that both correspond to the same region, and may also combine channel maps corresponding to different regions, thereby combining the techniques associated with the methods 700 and 800, described above on conjunction with FIGS. 7 and 8, respectively.

In sum, an access point coupled to a node within a network is configured to combine channel maps provided by other access points to which the node is coupled, thereby reconciling any discrepancies between those channel maps. The access point may also combine channel maps associated with different regions that the node may occupy, thereby reducing the number of channel maps that must be transmitted to the node when the node travel between regions.

Advantageously, the node is provided with a single channel map that is consistent across all access points to which the node is coupled and relevant within multiple regions that the node may occupy. Thus, the disclosed techniques may reduce the number of channel maps that must be transmitted to the node, thereby decreasing overall network traffic. In addition, the node does not need to change communication channels when coupled to different access points or when traversing between different regions. Accordingly, downtime associated with changing communication channels may be eliminated, thus improving the efficiency with which the node operates.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for generating a channel map for a first node within a network, the method comprising:
    acquiring a first channel map that includes a first set of channels on which the first node is configured to communicate, wherein the first channel map is generated by a first access point based on a first physical region in which the first node resides;
    acquiring a second channel map that includes a second set of channels on which the first node is configured to communicate, wherein the second channel map is generated by a second access point based on either the first physical region or a second physical region in which the first node is predicted to reside, wherein the first physical region is different than the second physical region, and wherein the second access point transmits the second channel map to either the first access point or the first node;
    combining the first channel map with the second channel map to generate a third channel map that resolves one or more conflicts between the first channel map and the second channel map, wherein a first channel included in the first channel map is added to the third channel map when performing an operation on both a quality of service value for the first channel and a quality of service value for a corresponding channel included in the second channel map generates a result that meets a first criterion; and
    causing the first node to communicate on a channel included in the third channel map,
    wherein each of the first channel map, the second channel map, and the third channel map specifies one or more channels within a television white space that are available to the first node for communications.

2. The computer-implemented method of claim 1, wherein the first channel map is stored in the first access point that serves the first physical region in which the first node resides, and the second channel map is acquired from the second access point that serves the second physical region in which the first node is predicted to reside, and further comprising transmitting the third channel map from the first access point to the node.

3. The computer-implemented method of claim 1, wherein the first channel map comprises a combination of a channel map stored by the first access point to which the first node is coupled and a channel map stored by the second access point to which the first node is coupled.

4. The computer-implemented method of claim 3, wherein the second channel map comprises a combination of a channel map associated with the first physical region in which the first node resides and a channel map associated with the second physical region in which the first node is predicted to reside.

5. The computer-implemented method of claim 1, wherein combining the first channel map with the second channel map comprises performing an AND operation between the first set of channels and the second set of channels, and the operation performed on both the quality of service value for the first channel and the quality of service value for the corresponding channel comprises one or more mathematical operations.

6. The computer-implemented method of claim 1, wherein the first channel map includes a quality of service value for the first set of channels, and the second channel map includes a quality of service value for the second set of channels.

7. The computer-implemented method of claim 1, wherein the operation comprises computing an average between the quality of service value for the first channel included in the first channel map and the quality of service value for the corresponding channel included in the second channel map, and the first channel is added to the third channel map when the average exceeds a threshold value.

8. The computer-implemented method of claim 1, wherein the operation comprises computing a minimum value of the quality of service value for the first channel included in the first channel map and the quality of service value for the corresponding channel included in the second channel map, and the first channel is added to the third channel map when the minimum value exceeds a threshold value.

9. The computer-implemented method of claim 1, further comprising transmitting the third channel map from the first access point to the first node.

10. The computer-implemented method of claim 9, further comprising:
    acquiring, at the second access point, the first channel map;
    acquiring, at the second access point, the second channel map;
    combining, at the second access point, the first channel map with the second channel map to generate a second version of the third channel map; and
    transmitting the second version of the third channel map from the second access point to the first node.

11. The computer-implemented method of claim 1, wherein the first access point acquires the second channel map from the second access point that is also coupled to the first node.

12. The computer-implemented method of claim 1, further comprising:
    acquiring, at the first access point, a fourth channel map;
    acquiring, at the first access point, a fifth channel map;
    transmitting the first channel map to the second access point;
    combining, at the first access point, the first channel map, the second channel map, the fourth channel map, and the fifth channel map to generate a first version of a sixth channel map; and
    transmitting the first version of the sixth channel map from the first access point to the first node.

13. The computer-implemented method of claim 12, further comprising:
    acquiring, at the second access point, the first channel map from the first access point;
    transmitting the fourth channel map and the fifth channel map to the first access point;
    combining, at the second access point, the first channel map, the second channel map, the fourth channel map, and the fifth channel map to generate a second version of the sixth channel map; and transmitting the second version of the sixth channel map from the second access point to the first node, wherein the first node is configured to communicate on a channel included in the first version of the sixth channel map or the second version of the sixth channel map.

14. One or more non-transitory computer-readable media that, when executed by one or more processors, cause the one or more processors to generate a channel map for a first node within a network by performing the steps of:

acquiring a first channel map that includes a first set of channels on which the first node is configured to communicate, wherein the first channel map is generated by a first access point based on a first physical region in which the first node resides;

acquiring a second channel map that includes a second set of channels on which the first node is configured to communicate, wherein the second channel map is generated by a second access point based on either the first physical region or a second physical region in which the first node is predicted to reside, wherein the first physical region is different than the second physical region, and wherein the second access point transmits the second channel map to either the first access point or the first node;

combining the first channel map with the second channel map to generate a third channel map that resolves one or more conflicts between the first channel map and the second channel map, wherein a first channel included in the first channel map is added to the third channel map when performing an operation on both a quality of service value for the first channel and a quality of service value for a corresponding channel included in the second channel map generates a result that meets a first criterion; and causing the first node to communicate on a channel included in the third channel map, wherein each of the first channel map, the second channel map, and the third channel map specifies one or more channels within a television white space that are available to the first node for communications.

15. The one or more non-transitory computer-readable media of claim 14, wherein the first channel map is stored in the first access point that serves the first physical region in which the first node resides, and the second channel map is acquired by the first access point from the second access point that serves the second physical region in which the first node is predicted to reside, and further comprising transmitting the third channel map from the first access point to the node.

16. The one or more non-transitory computer-readable media of claim 14, wherein the first channel map comprises a combination of a channel map stored by the first access point to which the first node is coupled and a channel map stored by the second access point to which the first node is coupled.

17. The one or more non-transitory computer-readable media of claim 16, wherein the second channel map comprises a combination of a channel map associated with the first physical region in which the first node resides and a channel map associated with the second physical region in which the first node is predicted to reside.

18. The one or more non-transitory computer-readable media of claim 14, wherein the step of combining the first channel map with the second channel map comprises performing an AND operation between the first set of channels and the second set of channels, and the operation performed on both the quality of service value for the first channel and the quality of service value for the corresponding channel comprises one or more mathematical operations.

19. The one or more non-transitory computer-readable media of claim 14, wherein the first channel map includes a quality of service value for the first set of channels, and the second channel map includes a quality of service value for the second set of channels.

20. The one or more non-transitory computer-readable media of claim 14, wherein the operation comprises computing an average between the quality of service value for the first channel included in the first channel map and the quality of service value for the corresponding channel included in the second channel map, and the first channel is added to the third channel map when the average exceeds a threshold value.

21. The one or more non-transitory computer-readable media of claim 14, wherein the operation comprises computing a minimum value of the quality of service value for the first channel included in the first channel map and the quality of service value for the corresponding channel included in the second channel map, and the first channel is added to the third channel map when the minimum value exceeds a threshold value.

22. The non-transitory computer-readable medium of claim 14, wherein the operation performed on both the quality of service value for the first channel and the quality of service value for the corresponding channel comprises one or more mathematical operations.

23. The non-transitory computer-readable medium of claim 14, wherein the operation performed on both the quality of service value for the first channel and the quality of service value for the corresponding channel comprises computing at least one of:

an average between the quality of service value for the first channel and the quality of service value for the corresponding channel, and a minimum value of the quality of service value for the first channel and the quality of service value for the corresponding channel, and wherein the first channel is added to the third channel map at least one of when the average exceeds a first threshold value and when the minimum value exceeds a second threshold value.

24. A system for generating a channel map for a first node within a network, including:

one or more processors configured to:

acquire a first channel map that includes a first set of channels on which the first node is configured to communicate, wherein the first channel map is generated by a first access point based on a first physical region in which the first node resides;

acquire a second channel map that includes a second set of channels on which the first node is configured to communicate, wherein the second channel map is generated by a second access point based on either the first physical region or a second physical region in which the first node is predicted to reside, wherein the first physical region is different than the second physical region, and wherein the second access point transmits the second channel map to either the first access point or the first node;

combine the first channel map with the second channel map to generate a third channel map that resolves one or more conflicts between the first channel map and the second channel map, wherein a first channel included in the first channel map is added to the third channel map when performing an operation on both a quality of service value for the first channel and a quality of service value for a corresponding channel included in the second channel map generates a result that meets a first criterion; and cause the first node to communicate on a channel included in the third channel map, wherein each of the first channel map, the second channel map, and the third channel map specifies one or more channels within a television white space that are available to the first node for communications.

25. The system of claim 24, further including:
one or more memories coupled to the one or more processors and storing program instructions that, when executed by the one or more processors, cause the one or more processors to:
acquire the first channel map;
acquire the second channel map;
combine the first channel map with the second channel map; and
cause the first node to communicate on the channel included in the third channel map.

26. A computer-implemented method for generating a channel map for a first node within a network, the method comprising:
acquiring a first channel map that includes a first set of channels on which the first node is configured to communicate, wherein the first channel map is generated based on a first physical region in which the first node resides, wherein the first channel map is stored in a first access point that serves the first physical region;
acquiring, by the first access point from a second access point that serves a second physical region in which the first node is predicted to reside, a second channel map that includes a second set of channels on which the first node is configured to communicate, wherein the second channel map is generated based on either the first physical region or the second physical region, wherein the first physical region is different than the second physical region, and wherein the first access point determines the second physical region in which the first node is predicted to reside;
combining, by the first access point, the first channel map with the second channel map to generate a third channel map that resolves one or more conflicts between the first channel map and the second channel map, wherein a first channel included in the first channel map is added to the third channel map when performing an operation on both a quality of service value for the first channel and a quality of service value for a corresponding channel included in the second channel map generates a result that meets a first criterion, and channels associated with one or more quality of service values below a threshold value are not added to the third channel map; and causing the first node to communicate on a channel included in the third channel map, wherein each of the first channel map, the second channel map, and the third channel map specifies one or more channels within a television white space that are available to the first node for communications.

27. One or more non-transitory computer-readable media that, when executed by one or more processors, causes the one or more processors to generate a channel map for a first node within a network by performing the steps of:
acquiring a first channel map that includes a first set of channels on which the first node is configured to communicate, wherein the first channel map is generated based on a first physical region in which the first node resides, wherein the first channel map is stored in a first access point that serves the first physical region;
acquiring, by the first access point from a second access point that serves a second physical region in which the first node is predicted to reside, a second channel map that includes a second set of channels on which the first node is configured to communicate, wherein the second channel map is generated based on either the first physical region or the second physical region, wherein the first physical region is different than the second physical region, and wherein the first access point determines the second physical region in which the first node is predicted to reside;
combining, by the first access point, the first channel map with the second channel map to generate a third channel map that resolves one or more conflicts between the first channel map and the second channel map, wherein a first channel included in the first channel map is added to the third channel map when performing an operation on both a quality of service value for the first channel and a quality of service value for a corresponding channel included in the second channel map generates a result that meets a first criterion, and channels associated with one or more quality of service values below a threshold value are not added to the third channel map; and causing the first node to communicate on a channel included in the third channel map, wherein each of the first channel map, the second channel map, and the third channel map specifies one or more channels within a television white space that are available to the first node for communications.

* * * * *